United States Patent Office

Re. 24,206
Reissued Aug. 28, 1956

24,206

VINYL CHLORIDE RESINS FOR APPLICATION AS SOLVENT SOLUTIONS

George P. Rowland, Jr., and Robert A. Piloni, Pottstown, Pa., assignors to The Firestone Tire & Rubber Company, Akron, Ohio, a corporation of Ohio No Drawing. Original No. 2,731,449, dated January 17, 1956, Serial No. 427,364, May 3, 1954. Application for reissue May 17, 1956, Serial No. 585,595

15 Claims. (Cl. 260—78.5)

Matter enclosed in heavy brackets [ ] appears in the original patent but forms no part of this reissue specification; matter printed in italics indicates the additions made by reissue.

This invention relates to novel vinyl chloride interpolymer resins particularly adapted for dissolving in solvents for application as coatings, paints, lacquers, inks, adhesives, and the like.

Vinyl chloride, resins, because of their cheapness, hardness, stability and other desirable properties, have long been considered potentially desirable as coatings, paints, lacquers, adhesives, inks, and the like. Unfortunately, however, these resins are not soluble in cheap hydrocarbons; are not compatible with alkyd resins; and do not exhibit good adhesion to metallic and other surfaces. For these reasons, the use of vinyl chloride resins in these fields has been somewhat limited.

Accordingly, it is an object of this invention to provide novel vinyl chloride resins suitable as solvent-applied coatings, paints, lacquers, inks, adhesives, and the like.

Another object is to provide such resins which are soluble in cheap hydrocarbon solvents such as benzene, toluene, xylene, and the like.

A further object is to provide such resins having good compatibility with the alkyd resins.

A further object is to provide such resins which will have good adhesion to metallic surfaces.

SYNOPSIS OF THE INVENTION

The above and other objects are secured, in accordance with this invention, in vinyl chloride, resins, having copolymerized therein:

| | Per cent |
|---|---|
| Vinyl chloride | 55–75 |
| A dihydrocarbon maleate, chloromaleate, or fumarate containing [4–22] *6–24* carbon atoms, or a mixture of esters of this type | 14–35 |
| A monohydrogen monoalkyl maleate, chloro maleate, or fumarate containing [3–12] *5–14* carbon atoms, or a mixture of esters of this type | 5–10 |
| Trichloroethylene | 1.5–6.5 |

The percentages cited are all on the basis of the total weight of the resin. Resins coming within the above compositional ranges have excellent solubility in hydrocarbon solvents, are stably compatible with alkyd resins, and have good adheson to metals. In addition to these desirable and unique properties, they also preserve unimpaired the excellent general properties of conventional vinyl chloride resins, particularly their hardness and their good resistance to aging. The resins of this invention find particular application to coatings, such as paints, especially for outdoor-exposed metal equipment; as inks; and as adhesives.

THE MALEIC AND FUMARIC DIESTERS AND HALF ESTERS

The maleic and fumaric dihydrocarbon esters, and monohydrocarbon monohydrogen half-esters employed as starting materials in the preparation of resins in accordance with this invention are esters, within the cited classes, in which the radicals, esterified by the maleic or fumaric acid are hydrocarbon radicals which contain from 1 to 10 carbon atoms. On this basis, the diesters will contain from [4 to 22] *6 to 24* carbon atoms, and the half-esters will contain from [3 to 12] *5 to 14* carbon atoms. Suitable hydrocarbon groups include methyl groups, ethyl groups, normal- and iso-propyl groups, normal-, secondary and tertiary butyl groups, the several amyl groups, n-hexyl groups, cyclohexyl groups, 2-ethyl hexyl groups, phenyl groups, benzyl groups, naphthyl groups, and the like. Specific exemplary diesters include dimethyl maleate, dimethyl fumarate, diethyl maleate, di-n-butyl maleate, di-n-butyl fumarate, di-n-propyl maleate, diisopropyl maleate, diisobutyl maleate, di-secondary butyl maleate, di-(2-ethyl hexyl) maleate, di(cyclohexyl) maleate, and dibenzyl maleate. Suitable half-esters include methyl hydrogen maleate, n-butyl hydrogen maleate, n-butyl hydrogen fumarate, n-propyl hydrogen maleate, benzyl hydrogen maleate, cyclohexyl hydrogen maleate, and the like. The esters used need not be pure compounds; thus mixtures of suitable dialkyl maleates and/or fumarates and mixtures of suitable monoalkyl monohydrogen maleates or fumarates may be used in lieu of pure esters of these respective types. It will also be understood that the maleates and fumarates will be indistinguishable in the product resins, since their unsaturation will be obliterated in the polymerization. A particularly useful combination of a specific dihydrocarbon ester and monohydrogen monohydrocarbon ester has been found to be the combination of (A) a commercial material offered as di-n-butyl maleate but actually containing approximately equal proportions of di-n-butyl maleate and di-n-butyl fumarate and (B) mono-n-butyl monohydrogen maleate.

THE PREPARATION OF THE INTERPOLYMERS OF THIS INVENTION

The interpolymers of this invention may be prepared by mixing together the several monomeric starting materials and subjecting them to any of the usual free-radical polymerization systems and conditions, for instance in solution in solvents, and in emulsion in aqueous media, using free-radical-generating catalysts and conditions. In practical production, however, it will usually be preferred to polymerize these materials in suspension in aqueous media by the known suspension polymerization technique. In general this technique involves suspending the monomers in an aqueous medium containing non-micelle-forming suspending agents. Suspending agents suitable for this purpose are hydrophilic high polymeric materials such as gelatin, polyvinyl alcohol, polyacrylic acid, polymaleic acid, methyl cellulose, and the like. The aqueous medium constitutes about at least half of the entire polymerization mass. The reaction is promoted by the presence of free-radical-generating agents soluble in the monomer phase of the suspension, such as benzoyl peroxide, perbenzoic acid, p-chlorobenzyl peroxide, t-butyl hydroperoxide and the like. The aqueous phase and the monomer phase are agitated together so as to suspend the latter in the former, and the temperature of the mass is adjusted to values such as to initiate the polymerization reaction, usually on the order of 30°–100° C. The monomers in the suspended droplets become polymerized, yielding a suspension of granular resin in the aqueous medium. From this aqueous suspension the resin is isolated by filtration.

PROPERTIES AND USES OF THE RESINS OF THIS INVENTION

The resins of the invention are soluble in cheap aromatic hydrocarbon solvents such as benzene, toluene, xylene, and the like in substantial proportions, say up to 30% of the total weight of the solution. Coatings formed from these solutions upon metallic and other surfaces are highly adhesive thereto and are not easily removed by abrasion or flexure of the substrate. The resins of this invention are compatible with the alkyd resins, both in solvent solutions and also in the dried films produced from solvent solutions of mixtures of the resins of this invention with alkyd resins. The resins of this invention accordingly find extensive use in coating compositions such as paints for use on metallic and other surfaces, particularly in coatings for metallic equipment subject to outside exposure conditions such as railway vehicles, automobiles, tractors, vending and dispensing machinery and the like. The resins of this invention are also very suitable for use in solvent-based inks for printing upon plastic and other surfaces. In view of their excellent adhesion to a wide variety of surfaces, the resins of this invention are further admirably adapted for use in the formulation of adhesives for joining metal, wood, plastics, and the like.

With the foregoing general discussion in mind, there are given herewith detailed examples of the practice of this invention. All parts given are by weight.

Example I

| | Parts |
|---|---|
| Vinyl chloride | 70 |
| Di-n-butyl maleate (Commercial grade, contains about 40–50% of di-n-butyl fumarate) | 21.67 |
| Mono-n-butyl monohydrogen maleate | 8.33 |
| Trichloroethylene | 2.92 |
| Benzoyl peroxide | 2.50 |
| PVM/MA (A copolymer of approximately equal parts of vinyl methyl ether and maleic anhydride. Specific viscosity in 1% aqueous solution, 3.0. Manufactured by General Aniline & Film Corp.) | 0.17 |
| Methyl cellulose (15 centipoise grade) | 0.10 |
| Water (deionized) | 216.67 |

The monomers above have the approximate ratios of vinyl chloride/dibutyl maleate/monobutyl maleate/trichloroethylene of 67.9/21.2/8.1/2.8. The above ingredients were charged to a reactor provided with a heating and cooling jacket, and with an anchor type stirrer. The free space in the reactor was purged with vinyl chloride, and agitation commenced at the rate of 28 revolutions per minute, and continued throughout the reaction which followed. The temperature was adjusted to 65° C., held at this value for three hours, and then lowered to 50° C. and held at this value for 21 hours. At the end of this time the unreacted vinyl chloride was vented, and the charge was cooled to 25° C., discharged, dewatered and washed on a filter with deionized water, and dried. The resultant resin had a relative viscosity, in 1.0% solution in cyclohexanone, of 1.35, and formed a clear 25% solution in toluene.

The resin was evaluated for compatibility with a wide variety of commercial glyptal resins as follows:

| | |
|---|---|
| Stock solution "A" | |
| Vinyl chloride resin (prepared as just described) | 25 parts. |
| Methyl ethyl ketone | 75 parts. |
| Compatibility mixture: | |
| Solution "A" | 1–5 parts |
| Hydrocarbon solvent solution of alkyd resin | (per Table I). [5–7] *5–1* parts (per Table I). |

A stock solution was made up from the ingredients listed at "A" and was used in all the tests to follow. The tests were conducted as follows: Solution "A" was mixed with samples of various commercial glyptal resins, which were supplied as concentrates in various hydrocarbon solvents. The weight ratios in which the solutions were mixed were: 1:5, 1:2, 1:1, 2:1, and 5:1. Each of the [reultant] *resultant* mixtures was visually examined and rated for compatibility. Likewise glass microscope slides were dipped into the solutions and dried for 48 hours, and the resultant films visually rated for compatibility.

An identical series was run for comparison, using, in place of the vinyl chloride resin according to the present invention, a vinyl chloride resin which is the only commercial resin offered at present as having good solution properties and compatibility with glyptal resins. The data for the two series of tests are [sent] *set* forth in Table I, the data for the resin of this invention being placed to the left and above the diagonal lines in the rectangles in the table, and the data for the commercial resin being placed to the right and below the said diagonal lines.

TABLE I

| Commercial Prepared Glyptal Resin Solution Concentrate | | | | | | Compatibility (See Codes Below) | | | | | | | | | | Test No. |
|---|---|---|---|---|---|---|---|---|---|---|---|---|---|---|---|---|
| Constituents of Alkyd Resin | | | | Solvent | Concentration of Resin in Solution (Percent) | In Solution: Ratio of Vinyl Chloride Resin Solution to Glyptal Resin Solution | | | | | | In Film: Ratio of Vinyl Chloride Resin Solution to Glyptal Resin Solution | | | | |
| Phthalic Anhydride (Percent) | Oil: Type | Oil: Percent | Phenolic Resin (Percent) | | | 1:5 | 1:2 | 1:1 | 2:1 | 5:1 | 1:5 | 1:2 | 1:1 | 2:1 | 5:1 | |
| 25 | Soya | 60 | ------ | Petroleum spirits. | 70 | I/I | C/I | P/I | P/I | P/P | / | N/ | N/ | N/ | VSl Hz/Hz | 1 |
| 30 | do | 50 | ------ | do | 60 | P/I | C/I | C/I | C/C | C/C | C/ | C/ | N/ | C/N | C/C | 2 |
| 39 | do | 38 | 4 | Xylene | 50 | C/I | C/C | P/P | P/P | I/P | C/ | Sl Hz/C | Sl Hz/N | Sl Hz/N | /Hz | 3 |
| 28 | "Drying Oil." | 28 | Present | do | 60 | C/I | C/I | C/C | I/C | I/C | C/ | C/ | Sl Hz/C | /C | /C | 4 |
| 35 | Castor | 45 | ------ | do | 65 | C/I | C/I | C/C | C/C | P/C | N/ | N/ | C/C | C/C | C/C | 5 |
| 43 | Coconut | 30 | ------ | do | 60 | P/I | P/C | C/C | C/C | C/C | C/ | Sl Hz/C | Sl Hz/C | VSl Hz/C | C/C | 6 |
| | "Short oxidizing." | -- | ------ | do | 50 | C/I | C/P | C/C | P/P | P/I | C/ | C/C | Sl Hz/C | Sl Hz/C | C/ | 7 |

CODES FOR COMPATIBILITY

Liquid compatibility:
- C Compatible
- P Partially compatible (cloudy solution)
- I Incompatible (immiscibility and gel formation)

Film compatibility:
- C Compatible, continuous film
- VSl Hz Very slight cloud in film
- Sl Hz Slightly hazy, cloudy film
- Hz Hazy, cloudy film (suitable for pigmented coatings)
- N Non-continuous film (mottled, rough film surface)

Rating for resin of this invention → / ← Rating for commercial resin

From an inspection of the table, it will be evident that the resins of this invention out-performed the commercial resin over substantially the entire range of comparison.

Example II

| | Parts |
|---|---|
| Vinyl chloride | 42 |
| Diethyl maleate | 13 |
| Mono-n-butyl monohydrogen maleate | 5 |
| Trichloroethylene | 4 |
| Luperco CDB (A 50% solution of p-chlorobenzoyl peroxide in di-butyl phthalate, manufactured by Lucidol Div., Novadel-Agene Corp.) | 20 |
| Methyl cellulose (15 cps. grade) | 0.8 |
| Aerosol MA (Dihexyl sodium sulfosuccinate, manufactured by American Cyanamid Co.) | 0.4 |
| Water (deionized) | 128 |

The above materials were charged into a reactor and polymerized at 50° C. for 24 hours. The resin recovered from the resultant suspension had a relative viscosity of 1.26 in 1% cyclohexanone solution, gase clear 25% solutions in toluene, and had excellent adhesion to metals and compatibility with alkyd resins.

Example III.—Various diesters

| | Parts by weight |
|---|---|
| Vinyl chloride | 42 |
| Maleate diester (Selected per Table II) | 13 |
| Mono-n-butyl monohydrogen maleate | 5 |
| Trichloroethylene | 2 |
| Benzoyl peroxide | 1 |
| PVM/MA (as in Example I) | 0.1 |
| Water (deionized) | 128 |

A series of runs was made using various different maleate diesters in the several runs as set out in Table II hereinafter. In each run the selected maleate diester, and other ingredients in the proportions set out in the above recipe, were charged into a reactor, polymerized and the resultant resin recovered as described in Example I. Set forth herewith in Table II are the properties of the resins.

TABLE II

| Maleate Diester Used | Properties of the Resin: Relative Viscosity [1] | 25% Toluene Solution | Solution Compatibility with alkyds [2] | Run No. |
|---|---|---|---|---|
| Diethyl maleate | 1.28 | Hazy | P | 1 |
| Di-n-propyl maleate | 1.40 | do | P | 2 |
| Di-isopropyl maleate | 1.26 | do | P | 3 |
| Di-isobutyl maleate | 1.30 | Faintly Hazy. | C | 4 |
| Di-sec-butyl maleate | 1.28 | do | C | 5 |
| Diisopropyl chloromaleate | 1.22 | do | C | 6 |
| Di-(2-ethyl hexyl) maleate | 1.32 | Hazy | C | 7 |

[1] In 1% cyclohexanone solution.
[2] Same code as in Table I; the test alkyd was that of item No. 6, and the test was made with a 1:1 ratio of solutions.

All of these resins formed clear 35% solutions in methyl ethyl ketone, and adhered well to metals when coated thereon.

Example IV.—Various proportions of comonomers

| | Parts by weight |
|---|---|
| Vinyl chloride | Varied per Table III. |
| Di-n-butyl maleate | |
| Mono(n-butyl) monohydrogen maleate | |
| Trichloroethylene | |
| Benzoyl peroxide | 1. |
| PVM/MA (as in Example I) | 0.1. |
| Water (deionized) | 128. |

A series of runs was made, using the monomeric materials in different proportions in the several runs as set forth in Table III. In each case the monomers in the stated proportions, and other ingredients as listed in the recipe, were polymerized as in Example I. All of these materials formed clear 35% solutions in methyl ethyl ketone, and coatings [thereon] *thereof* on metals had good adhesion thereto.

TABLE III

| Monomers Used (Parts) | | | | Properties of the Resins | | | Run No. |
|---|---|---|---|---|---|---|---|
| Vinyl Chloride | Dibutyl Maleate | Mono-butyl Maleate | Tri-chloro-ethylene | Relative Viscosity [1] | 25% Toluene Solution | Solution Compatibility with alkyds [2] | |
| 35 | 20 | 5 | 1 | 1.32 | Clear | P | 1 |
| 30 | 25 | 5 | 0.5 | 1.22 | Hazy | I | 2 |
| 45 | 10 | 5 | 3 | 1.30 | do | C | 3 |
| 48 | 7 | 5 | 3 | 1.30 | Insoluble | C | 4 |
| 42 | 8 | 8 | 3 | 1.30 | do | C | 5 |
| 42 | 3 | 15 | 3 | 1.30 | do | C | 6 |
| 42 | 0 | 18 | 3 | 1.31 | do | C | 7 |
| 42 | 14 | 4 | 2 | 1.31 | Clear | C | 8 |
| 48 | 9 | 3 | 6 | 1.32 | Insoluble | C | 9 |

[1] In 1% cyclohexanone solution.
[2] Same code as in Table I; the test alkyd resin was that of item No. 6, and the test was made with a 1:1 ratio of solutions.

Example V

| | Parts by weight |
|---|---|
| Vinyl chloride | 42 |
| Di(n-butyl) maleate | 13 |
| Mono-cyclohexyl monohydrogen maleate | 5 |
| Trichloroethylene | 2 |
| Luperco CDB (as in Example II) | 2 |
| Surfax No. 1288 | 0.3 |
| (An alkylaryl ester sulfonate, 60% active ingredients; AATCC Year Book 1950, p. [635] *365*, manufactured by E. F. Houghton & Co.) | |
| Water (deionized) | 128 |

The above ingredients were polymerized as in Example I. The product resin formed a hazy 25% solution in toluene, a clear 35% solution in methyl ethyl ketone, was compatible with alkyd resin in 1:1 ratio by the test of Table I, item No. 6, and had fair adhesion to metals.

Example VI

The procedure of Example V was repeated, substituting mono-benzyl monohydrogen maleate for the mono-cyclohexyl maleate. The product was substantially the same as that of Example V, except that the 25% toluene solution was only slightly hazy, and the test on alkyd compatibility showed a slight cloudiness.

From the foregoing general discussion and detailed specific examples, it will be evident that this invention provides novel vinyl chloride resins admirably suited for applications involving solutions in aromatic hydrocarbon solvents as in coatings, lacquers, paints, inks, adhesives and the like. The resins are all characterized by good compatibility with alkyd resins and good adhesion to metallic and other surfaces.

What is claimed is:

1. A copolymer of

| | Per cent |
|---|---|
| Vinyl chloride | 55–75 |
| A dialkyl ester of an acid selected from the group consisting of maleic, fumaric, and chloromaleic acids containing [4–22] *6–24* carbon atoms | 14–35 |
| A monoalkyl monohydrogen ester of an acid selected from the group consisting of maleic, fumaric, and chloromaleic acids containing [3–12] *5–14* carbon atoms | 5–10 |
| Trichloroethylene | 1.5–6.5 |

the percentages being based on the total weight of the copolymer.

2. A copolymer of

| | Per cent |
|---|---|
| Vinyl chloride | 55–75 |
| A mixture of di-n-butyl maleate and di-n-butyl fumarate in approximately equal proportions | 14–35 |
| A monoalkyl monohydrogen ester of an acid selected from the group consisting of maleic, fumaric, and chloromaleic acids containing [3–12] *5–14* carbon atoms | 5–10 |
| Trichloroethylene | 1.5–6.5 |

the percentages being based on the total weight of the copolymer.

3. A copolymer of

| | Per cent |
|---|---|
| Vinyl chloride | 55–75 |
| A mixture of di-n-butyl maleate and di-n-butyl fumarate in approximately equal proportions | 14–35 |
| Mono-n-butyl monohydrogen maleate | 5–10 |
| Trichloroethylene | 1.5–6.5 |

the percentages being based on the total weight of the copolymer.

4. A copolymer of

| | Per cent |
|---|---|
| Vinyl chloride | 67.9 |
| A mixture of di-n-butyl maleate and di-n-butyl fumarate in approximately equal proportions | 21.2 |
| Mono-n-butyl monohydrogen maleate | 8.1 |
| Trichloroethylene | 2.8 |

the percentages being based on the total weight of the copolymer.

5. A copolymer of

| | Per cent |
|---|---|
| Vinyl chloride | 55–75 |
| Di(2-ethyl hexyl) maleate | 14–35 |
| A monoalkyl monohydrogen ester of an acid selected from the group consisting of maleic, fumaric, and chloromaleic acids containing [3–12] *5–14* carbon atoms | 5–10 |
| Trichloroethylene | 1.5–6.5 |

the percentages being based on the total weight of the copolymer.

6. A copolymer of

| | Per cent |
|---|---|
| Vinyl chloride | 55–75 |
| Di(2-ethyl hexyl) maleate | 14–35 |
| Mono-n-butyl monohydrogen maleate | 5–10 |
| Trichloroethylene | 1.5–6.5 |

the percentages being based on the total weight of the copolymer.

7. A copolymer of

| | Per cent |
|---|---|
| Vinyl chloride | 67.7 |
| Di-(2-ethyl hexyl) maleate | 21.0 |
| Mono-n-butyl monohydrogen maleate | 8.1 |
| Trichloroethylene | 3.2 |

the percentages being based on the total weight of the copolymer.

8. A copolymer of

| | Per cent |
|---|---|
| Vinyl chloride | 55–75 |
| Di-n-butyl maleate | 14–35 |
| A monoalkyl monohydrogen ester of an acid selected from the group consisting of maleic, fumaric, and chloromaleic acids containing [3–12] *5–14* carbon atoms | 5–10 |
| Trichloroethylene | 1.5–6.5 |

the percentages being based on the total weight of the copolymer.

9. A copolymer of

| | Per cent |
|---|---|
| Vinyl chloride | 55–75 |
| Di-n-butyl maleate | 14–35 |
| Mono-n-butyl monohydrogen maleate | 5–10 |
| Trichloroethylene | 1.5–6.5 |

the percentages being based on the total weight of the copolymer.

10. A copolymer of

| | Per cent |
|---|---|
| Vinyl chloride | 67.7 |
| Di-n-butyl maleate | 21.0 |
| Mono-n-butyl monohydrogen maleate | 8.1 |
| Trichloroethylene | 3.2 |

the percentages being based on the total weight of the copolymer.

11. A copolymer of

| | Per cent |
|---|---|
| Vinyl chloride | 55–75 |
| Di-ethyl maleate | 14–35 |

| | |
|---|---|
| A monoalkyl monohydrogen ester of an acid selected from the group consisting of maleic, fumaric, and chloromaleic acids containing [3–12] *5–14* carbon atoms | 5–10 |
| Trichloroethylene | 1.5–6.5 |

the percentages being based on the total weight of the copolymer.

12. A copolymer of

| | Per cent |
|---|---|
| Vinyl chloride | 55–75 |
| Di-ethyl maleate | 14–35 |
| Mono-n-butyl monohydrogen maleate | 5–10 |
| Trichloroethylene | 1.5–6.5 |

the percentages being based on the total weight of the copolymer.

13. A copolymer of

| | Per cent |
|---|---|
| Vinyl chloride | 67.7 |
| Di-ethyl maleate | 21.0 |
| Mono-n-butyl monohydrogen maleate | 8.1 |
| Trichloroethylene | 3.2 |

the percentages being based on the total weight of the copolymer.

14. A copolymer of

| | Per cent |
|---|---|
| Vinyl chloride | 55–75 |
| Dibutyl maleate | 14–35 |
| Monocyclohexyl monohydrogen maleate | 5–10 |
| Trichloroethylene | 1.5–6.5 |

the percentages being based on the total weight of the copolymer.

15. A copolymer of

| | Per cent |
|---|---|
| Vinyl chloride | 67.7 |
| Dibutyl maleate | 21.0 |
| Monocyclohexyl monohydrogen maleate | 8.1 |
| Trichloroethylene | 3.2 |

the percentages being based on the total weight of the copolymer.

No references cited.